United States Patent
Pang et al.

(10) Patent No.: US 9,864,437 B2
(45) Date of Patent: Jan. 9, 2018

(54) CIRCUIT AND METHOD FOR DETECTING WORKING AND RESTING STATES FOR OPTICAL MOUSE

(71) Applicant: PIXART IMAGING (PENANG) SDN. BHD., Penang (MY)

(72) Inventors: Kwai Lee Pang, Penang (MY); Kevin Len-Li Lim, Penang (MY)

(73) Assignee: PIXART IMAGING (PENANG) SDN. BHD., Penang (MY)

( * ) Notice: Subject to any disclaimer, the term of this patent is extended or adjusted under 35 U.S.C. 154(b) by 109 days.

(21) Appl. No.: 15/077,872

(22) Filed: Mar. 22, 2016

(65) Prior Publication Data

US 2017/0277278 A1  Sep. 28, 2017

(51) Int. Cl.

| | |
|---|---|
| *G06F 3/03* | (2006.01) |
| *G06F 3/0354* | (2013.01) |
| *G06F 3/0346* | (2013.01) |
| *G01J 1/44* | (2006.01) |
| *G06F 3/033* | (2013.01) |
| *G06F 3/038* | (2013.01) |

(52) U.S. Cl.
CPC .............. *G06F 3/0317* (2013.01); *G01J 1/44* (2013.01); *G06F 3/033* (2013.01); *G06F 3/038* (2013.01); *G06F 3/0346* (2013.01); *G06F 3/0354* (2013.01); *G06F 3/03543* (2013.01); *G01J 2001/442* (2013.01)

(58) Field of Classification Search
CPC .. G06F 3/0317; G06F 3/0346; G06F 3/03543; G06F 3/033; G06F 3/0354; G06F 3/038; G01J 1/44; G01J 2001/442
See application file for complete search history.

(56) References Cited

U.S. PATENT DOCUMENTS

| | | | | |
|---|---|---|---|---|
| 5,627,565 | A * | 5/1997 | Morishita | G06F 3/0325 345/157 |
| 7,738,019 | B2 * | 6/2010 | Misek | H04N 5/2351 348/297 |
| 9,412,784 | B1 * | 8/2016 | Lim | H01L 27/14681 |
| 2006/0181628 | A1 * | 8/2006 | Kishi | H04N 3/1512 348/308 |
| 2015/0242112 | A1 * | 8/2015 | Bielitz | G06F 3/0383 345/163 |
| 2015/0277588 | A1 * | 10/2015 | Pang | G06F 3/03543 345/166 |

* cited by examiner

*Primary Examiner* — Patrick F Marinelli
*Assistant Examiner* — Eboni Hughes
(74) *Attorney, Agent, or Firm* — Li & Cai Intellectual Property (USA) Office

(57) ABSTRACT

Disclosed is a circuit for detecting working and resting states for an optical mouse. During each frame capture, a counting unit of the digital logic circuit outputs a first counting signal to turn on a switching transistor, such that the voltage of the pixel capacitor varies from its predetermined voltage, and the counting unit starts to count. The automatic gain control module outputs a second counting signal as the voltage of the pixel capacitor varies one threshold from the predetermined voltage, such that the counting unit stops counting and outputs a counting value. A computing unit computes a difference between the counting value and a reference counting value. The optical mouse is in a resting state if the difference is equal to or smaller than a threshold difference, and otherwise the optical mouse is in a working state.

19 Claims, 5 Drawing Sheets

CIRCUIT AND METHOD FOR DETECTING WORKING AND RESTING STATES FOR OPTICAL MOUSE

BACKGROUND OF THE INVENTION

1. Field of the Invention

The instant disclosure relates to a circuit and a method for detecting working and resting states for an optical mouse; in particular, to a circuit and a method for detecting working and resting states for an optical mouse which can simplify the working mechanism for detecting working and resting states for an optical mouse.

2. Description of Related Art

As known in the common working principle of the optical mouse, in order to obtain the displacement data of the optical mouse and to detect the working and resting states of the optical mouse, a plurality of images must be captured by the light sensing element and then stored to be processed. Until they are processed and analyzed, the state of the optical mouse (the working state and the resting state) and the displacement data of the optical mouse cannot be learned.

Specifically speaking, traditionally, in order to detect the working and resting states for the optical mouse, it is essential to capture the full images and to optimize the captured images via the image spatial filters for determining the state of the optical mouse. Moreover, in the traditional way to detect the working and resting states for the optical mouse, a larger amount of memory is needed for storing the reference images and for the newly captured images to be processed.

SUMMARY OF THE INVENTION

The instant disclosure provides a circuit for detecting working and resting states for an optical mouse, comprising a pixel array, at least one automatic gain control module and a digital logic circuit. The pixel array comprises a plurality of pixel circuits, wherein each pixel circuit comprises a photo detector, a pixel capacitor and a switching transistor. The pixel capacitor is charged to a predetermined voltage in advance, wherein one end of the pixel capacitor is grounded. Source of the switching transistor is electrically connected to the other end of the pixel capacitor, drain of the switching transistor is electrically connected to the photo detector and gate of the switching transistor is grounded. The automatic gain control module is electrically connected to the pixel array to monitor the voltage variation of the pixel capacitor. The digital logic circuit is electrically connected to the automatic gain control module and comprises at least one counting unit and a computing unit. During each frame capture, as the photo detector is turned on via receiving a reflecting light, the counting unit outputs a first counting signal to the automatic gain control module to turn on the switching transistor, such that the pixel capacitor begins to discharge and the voltage of the pixel capacitor starts to vary from the predetermined voltage, and at the same time the counting unit starts to count. The automatic gain control module outputs a second counting signal to the digital logic circuit as the voltage of the pixel capacitor varies one threshold from the predetermined voltage, such that the counting unit of the digital logic circuit stops counting and outputs a counting value. The computing unit is electrically connected to the counting unit to receive the counting value and compute a difference between the counting value and a reference counting value. The optical mouse is determined to be in a resting state if the difference is equal to or smaller than a threshold difference, and the optical mouse is determined to be in a working state if the difference is larger than a threshold difference.

In one embodiment of the instant disclosure, the pixel circuits at the outer ring of the pixel array are partitioned into a first pixel block, a second pixel block, a third pixel block and a fourth pixel block. The first pixel block, the second pixel block, the third pixel block and the fourth pixel block are electrically connected to a first automatic gain control module, a second automatic gain control module, a third automatic gain control module and a fourth automatic gain control module respectively, so as to monitor an average voltage of the pixel capacitors within each pixel block.

In one embodiment of the instant disclosure, the pixel circuits at the diagonal portions of the pixel array are partitioned into a first pixel block and a second pixel block, wherein the first pixel block and the second pixel block are electrically connected to a first automatic gain control module and a second automatic gain control module respectively, so as to monitor an average voltage of the pixel capacitors within each pixel block.

The instant disclosure further provides a method for detecting working and resting states for an optical mouse, used in a circuit for detecting working and resting states for an optical mouse. The circuit comprises a pixel array, at least one automatic gain control module and a digital logic circuit. The pixel array comprises a plurality of pixel circuits and each pixel circuit comprises a photo detector, a pixel capacitor charged to a predetermined voltage and a switching transistor. The digital logic circuit comprises at least one counting unit and a computing unit. The method for detecting working and resting states for an optical mouse comprising: during each frame capture, outputting a first signal to turn on the switching unit as the photo detector is turned on via receiving a reflecting light, and at the same time starting to count; monitoring the voltage of the pixel capacitor, and outputting a second counting signal as the voltage of the pixel capacitor varies one threshold from the predetermined voltage, such that the counting unit stops counting and outputs a counting value; and computing a difference between the counting value and a reference counting value. If the difference is equal to or smaller than a threshold difference, the optical mouse is determined to be in a resting state, and if the difference is larger than the threshold difference, the optical mouse is determined to be in a working state.

The instant disclosure further provides a method for detecting working and resting states for an optical mouse, used in a circuit for detecting working and resting states for an optical mouse. The circuit comprises a pixel array, at least one automatic gain control module and a digital logic circuit. The pixel array comprises a plurality of pixel circuits, and part of the pixel circuits partitioned into a plurality of pixel blocks. Each pixel circuit comprises a photo detector and a pixel capacitor charged to a predetermined voltage. The digital logic circuit comprises a plurality of counting units and a computing unit. During each frame capture, as the photo detector is turned on via receiving a reflecting light, the pixel capacitor begins to discharge, and the voltage of the pixel capacitor varies from the predetermined voltage. The method for detecting working and resting states for an optical mouse comprising: monitoring an average voltage of the pixel capacitors within each pixel block, and outputting a first counting signal as the average voltage varying from the predetermined voltage, such that each counting unit starts to count; respectively outputting a second counting signal as the average voltage varies one threshold from the predetermined voltage, such that the counting units respectively stop counting and output a counting value; and computing a difference between each of the counting values and a reference counting value respectively, and computing a sum of the differences. If the sum of the differences is equal to or smaller than a threshold sum of difference, the optical mouse is determined to be in a resting state, and if the threshold sum of difference is larger than the threshold difference, the optical mouse is determined to be in a working state.

In one embodiment of the instant disclosure, the pixel blocks are at the outer ring of the pixel array, and in another embodiment of the instant disclosure, the pixel blocks are at the diagonal portions of the pixel array.

From the above, it is understood that, compared with the traditional circuit and method for detecting working and resting states for an optical mouse, to detect working and resting states for an optical mouse, the instant disclosure does not capture full images and use spatial filters for the image optimization. Moreover, the instant disclosure does not need a large amount of memory to store the reference images and the newly-captured images which are to be processed.

Instead, the circuit and method for detecting working and resting states for an optical mouse provided by the instant disclosure monitors the voltage variation of the pixel capacitor, and generates a counting value via a counter as the voltage of the pixel capacitor varies from a predetermined voltage value. After that, the instant disclosure compares the counting value and the reference counting value and obtains a difference there between, and based on the difference, the instant disclosure can easily determine the state of the optical mouse, which not only simplifies the working mechanism for detecting working and resting states of an optical mouse, but also reduces the element cost for the circuit.

For further understanding of the instant disclosure, reference is made to the following detailed description illustrating the embodiments of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
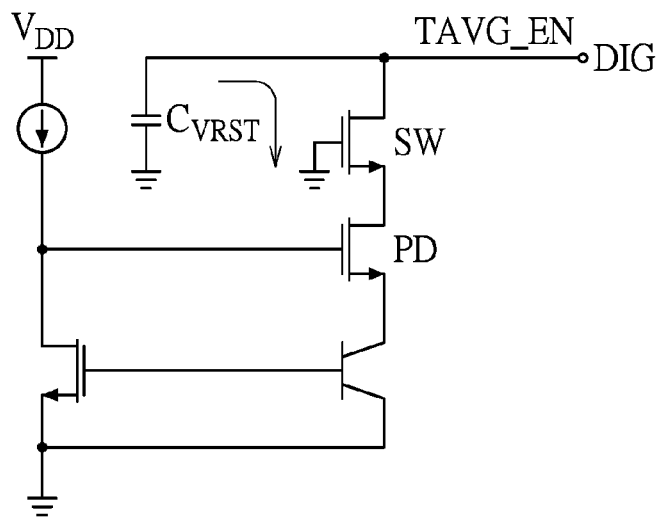
FIG. 1 shows a circuit diagram of a pixel circuit within a pixel array of the circuit for detecting working and resting states for an optical mouse in one embodiment of the instant disclosure.

Please refer to FIG. 1. FIG. 1 shows a circuit diagram of a pixel circuit within a pixel array of the circuit for detecting working and resting states for an optical mouse in one embodiment of the instant disclosure. A pixel array in the circuit for detecting working and resting states for an optical mouse provided by the instant disclosure comprises a plurality of pixel circuits as shown in FIG. 1. According to the circuit shown in FIG. 1, the pixel circuit 1 at least comprises a photo detector PD, a pixel capacitor $C_{VRST}$ and a switching transistor SW, wherein the pixel capacitor $C_{VRST}$ has one end to be grounded. Source of the switching transistor SW is electrically connected to the other end of the pixel capacitor $C_{VRST}$, drain of the switching transistor SW is electrically connected to the photo detector PD and gate of the of the switching transistor SW is grounded. It should be noted that, the pixel capacitor $C_{VRST}$ is charged to a predetermined voltage VRST in advance. When receiving a reflecting light, the photo detector PD is turned on.

Figure 2:
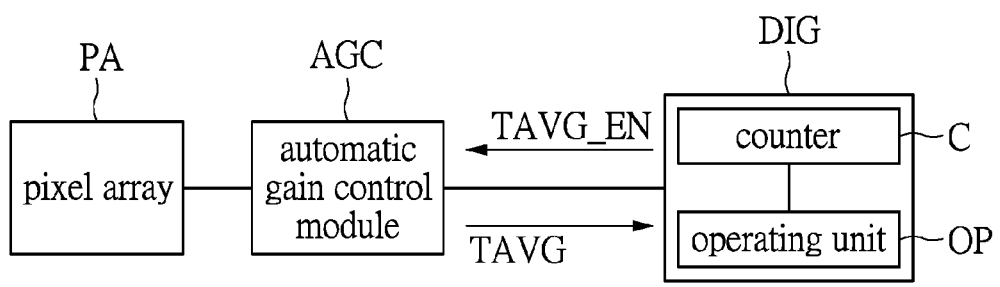
FIG. 2 shows a block diagram of a circuit for detecting working and resting states for an optical mouse in one embodiment of the instant disclosure.

One Embodiment of the Circuit for Detecting Working and Resting States of an Optical Mouse In the following description, there is an embodiment for illustrating the circuit for detecting working and resting states of an optical mouse provided by the instant disclosure. Please refer to FIG. 2. FIG. 2 shows a block diagram of a circuit for detecting working and resting states for an optical mouse in one embodiment of the instant disclosure. As shown in FIG. 2, the circuit for detecting working and resting states for an optical mouse 2 comprises a pixel array PA comprising a plurality of pixel circuits 1, at least one automatic gain control module AGC and a digital logic circuit DIG. The automatic gain control module AGC is electrically connected to the pixel array PA, to monitor the voltage variation of the pixel capacitors $C_{VRST}$ in the pixel array PA. The digital logic circuit DIG is electrically connected to the automatic gain control module AGC, and comprises at least one counting unit C and an operating unit, such as a counter and a comparator, for processing the monitoring of voltage variation of the pixel capacitors $C_{VRST}$. The operating unit OP is electrically connected to the counting unit C.

Figure 3:
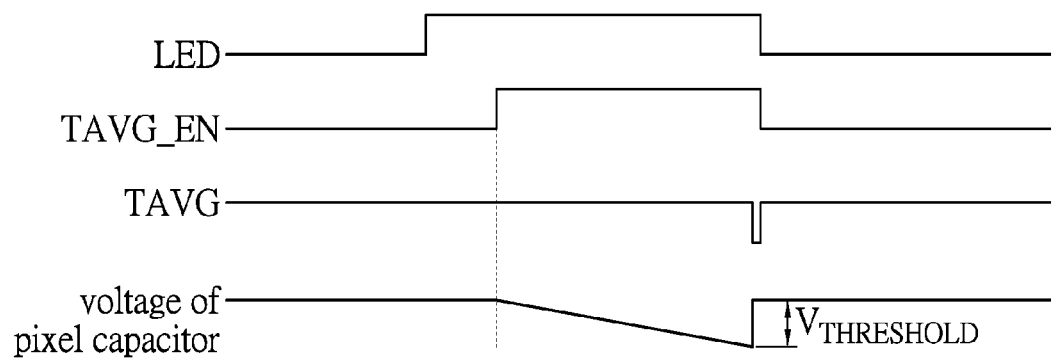
FIG. 3 shows a waveform diagram of a circuit for detecting working and resting states for an optical mouse in one embodiment of the instant disclosure.

In order to further illustrate the working principle of the circuit for detecting working and resting states for an optical mouse 2, please refer to FIG. 3. FIG. 3 shows a waveform diagram of a circuit for detecting working and resting states for an optical mouse in one embodiment of the instant disclosure.

As shown in FIG. 3, during each frame capture, the light emitting diode LED of the optical mouse is turned on, and the photo detector PD would be turned on via receiving a reflecting light, so that the counting unit C outputs a first counting signal to the automatic gain control module AGC as a control signal to turn on the switching transistor SW. As a result, the pixel capacitor $C_{VRST}$ begins to discharge, and the voltage of pixel capacitor $C_{VRST}$ varies from the predetermined voltage VRST, and at the same time the counting unit C starts to count for detecting the working state and the working state of an optical mouse (as shown in FIG. 3, once the first counting signal TVAG_EN is triggered, the voltage of pixel capacitor $C_{VRST}$ varies), and at the same time the counting unit C of the digital logic circuit DIG starts to count. After that, the automatic gain control module AGC outputs a second counting signal TAVG to the digital logic circuit DIG, as the voltage of pixel capacitor $C_{VRST}$ varies one threshold voltage $V_{THRESHOLD}$ from the predetermined voltage VRST (as shown in FIG. 3, as the voltage of pixel capacitor $C_{VRST}$ varies one threshold voltage $V_{THRESHOLD}$ from its starting voltage value, the second counting signal TAVG is triggered), such that the counting unit C of the digital logic circuit DIG stops counting and generates a counting value. In terms of circuitry, the counting value refers to a counting number of the high-level first counting signal TAVG_EN. In terms of physics, the counting value refers to the time consumption for the voltage of pixel capacitor $C_{VRST}$ varying one threshold voltage $V_{THRESHOLD}$ from the predetermined voltage VRST.

The above generated counting value generated by the counting unit C of the digital logic circuit DIG is received by the operating unit OP of the digital logic circuit DIG. The operating unit OP of the digital logic circuit DIG computes a difference between the counting value and a reference counting value. The optical mouse is determined to be in a resting state if the difference is equal to or smaller than a threshold difference, and the optical mouse is determined to be in a working state if the difference is larger than a threshold difference.

In this embodiment, the definitions of the reference counting value can be illustrated by the following examples. For one example, the reference counting value is defined as a counting value outputted by the counting unit during the previous frame capture. In other words, during each frame capture, the operating unit OP of the digital logic circuit DIG computes a difference between the counting value generated in the present frame capture and the counting value generated in the previous frame capture. In short, the two counting values for computation should be from two sequential frame captures. For another example, the reference counting value is a counting value outputted by the counting unit during one frame capture when the optical mouse is in the resting state. In other words, the counting value generated by the counting unit C of the digital logic circuit DIG, during one frame capture as the optical mouse is in the resting state, is defined as the reference counting value. From then on, every counting value generated by the counting unit C during each frame capture is compared with the above reference counting value, and a difference is obtained. In short, the two counting values for computation need not to be from two sequential frame captures.

From this embodiment, it can be understood that, compared with the traditional method for computation which should be from two sequential frame captures to detect working and resting states for an optical mouse, the instant disclosure does not capture full images and use spatial filters for the image optimization. Moreover, the instant disclosure does not need a large amount of memory to store the reference images and the newly-captured images which are to be processed.

In the following description, there is another embodiment provided by the instant disclosure for further illustrating the circuit for detecting working and resting states for an optical mouse provided by the instant disclosure. In the embodiment to be described, only different parts from the embodiment are shown in FIG. 2, as the omitted parts are identical to the embodiment shown in FIG. 2. In addition, for easy instruction, similar reference numbers or symbols refer to the same elements.

Figure 4:
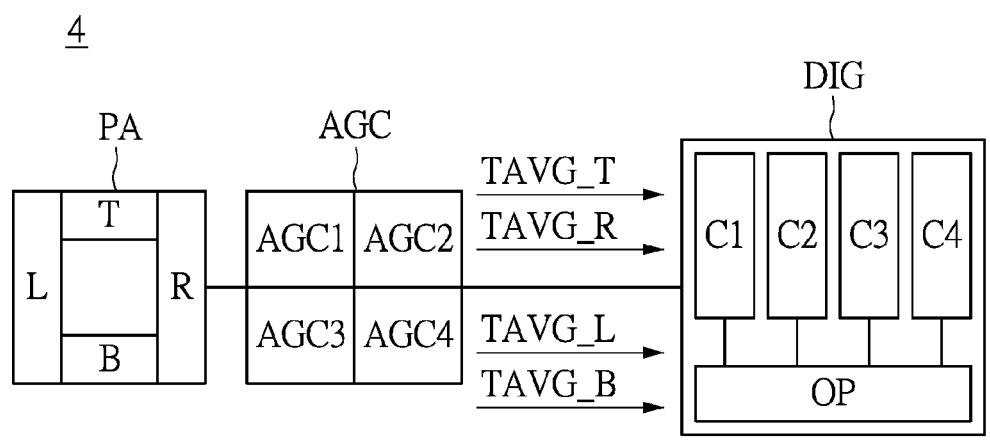
FIG. 4 shows a block diagram of a circuit for detecting working and resting states for an optical mouse in another embodiment of the instant disclosure.

Another Embodiment of the Circuit for Detecting Working and Resting States for an Optical Mouse Please refer to FIG. 4. FIG. 4 shows a block diagram of a circuit for detecting working and resting states for an optical mouse in another embodiment of the instant disclosure. The circuit elements and working principle of the circuit for detecting working and resting states for an optical mouse in this embodiment and the circuit elements and working principle of the circuit for detecting working and resting states for an optical mouse as shown in FIG. 2 are similar. The difference between the two embodiments is that, as shown in FIG. 4, the pixel circuits at the outer ring of the pixel array PA are partitioned into a first pixel block T, a second pixel block R, a third pixel block B and a fourth pixel block L. The first pixel block T, the second pixel block R, the third pixel block B and the fourth pixel block L are electrically connected to a first automatic gain control module AGC1, a second automatic gain control module AGC2, a third automatic gain control module AGC3 and a fourth automatic gain control module AGC4 of the automatic gain control module AGC respectively, so as to monitor an average voltage of the pixel capacitors within each pixel block T, R, B and L.

Figure 5:
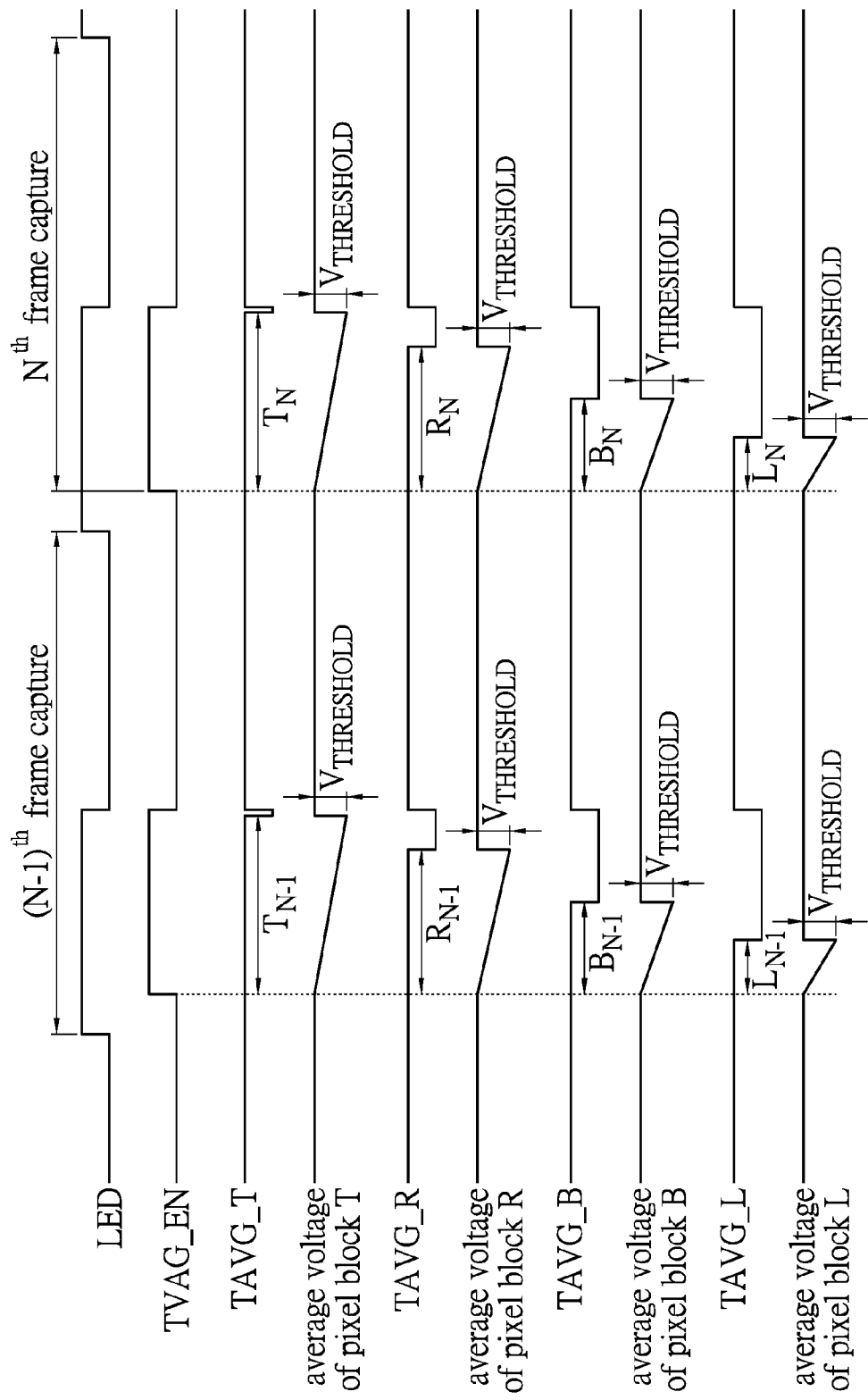
FIG. 5 shows a waveform diagram of a circuit for detecting working and resting states for an optical mouse in another embodiment of the instant disclosure.

In order to further illustrate the working principle of the circuit for detecting working and resting states for an optical mouse 4, please refer to FIG. 5. FIG. 5 shows a waveform diagram of a circuit for detecting working and resting states for an optical mouse in another embodiment of the instant disclosure.

As shown in FIG. 5, during each frame capture, the light emitting diode LED of the optical mouse is turned on, and the photo detectors PD within the four pixel blocks T, R, B and L are turned on via receiving the reflecting lights, so that a first counting unit C1, a second counting unit C2, a third counting unit C3 and a fourth counting unit C4 of the digital logic circuit DIG respectively output a first counting signal TAVG_EN to the first automatic gain control module AGC1, the second automatic gain control module AGC2, the third automatic gain control module AGC3 and the fourth automatic gain control module AGC4 of the automatic gain control module AGC as control signals to turn the switching transistors in the four pixel blocks T, R, B and L. As a result, the pixel capacitors $C_{VRST}$ within the four pixel blocks T, R, B and L begin to discharge. During discharging, and the average voltages of pixel capacitors $C_{VRST}$ within the four pixel blocks T, R, B and L vary from the predetermined voltage VRST (as shown in FIG. 5, once the first counting signals are respectively triggered, the average voltages of pixel capacitors $C_{VRST}$ within the four pixel blocks T, R, B and L vary from the predetermined voltage VRST), and at the same time the first counting unit C1, the second counting unit C2, the third counting unit C3 and the fourth counting unit C4 of the digital logic circuit DIG start to count to detect working and resting states for an optical mouse.

After that, the first automatic gain control module AGC1, the second automatic gain control module AGC 2, the third automatic gain control module AGC3 and the fourth automatic gain control module AGC4 respectively output a second counting signal TAVG_T, TAVG_R, TAVG_B and TAVG_L to the digital logic circuit DIG, as the average voltages of pixel capacitors $C_{VRST}$ within four pixel blocks T, R, B and L respectively vary one threshold voltage from the predetermined voltage VRST. It is worth mentioning that, the time consumptions for the average voltages of pixel capacitors $C_{VRST}$ within four pixel blocks T, R, B and L respectively vary one threshold voltage from the predetermined voltage VRST may be different. Thus, as shown in FIG. 5, the timings when the first automatic gain control module AGC1, the second automatic gain control module AGC 2, the third automatic gain control module AGC3 and the fourth automatic gain control module AGC4 respectively output the second counting signal TAVG_T, TAVG_R, TAVG_B and TAVG_L to the digital logic circuit DIG may be also different.

Once the first counting unit C1, the second counting unit C2, the third counting unit C3 and fourth counting unit C4 of the digital logic circuit DIG respectively receives the second counting signal TAVG_T, TAVG_R, TAVG_B and TAVG_L, they stop counting and respectively generate a first counting value, a second counting value, a third counting value and a fourth counting value. In terms of circuitry, these counting values refer to counting numbers of the high-level first counting signal TAVG_EN. In terms of physics, the counting values refer to the time consumption for the average voltages of pixel capacitors $C_{VRST}$ within the four pixel blocks T, R, B and L respectively varying one threshold voltage $V_{THRESHOLD}$ from the predetermined voltage VRST.

After that, the first counting value, the second counting value, the third counting value and the fourth counting value generated by the first counting unit C1, the second counting unit C2, the third counting unit C3 and fourth counting unit C4 of the digital logic circuit DIG are received by the operating unit OP of the digital logic circuit DIG. The operating unit OP of the digital logic circuit DIG computes differences between these counting values and a reference counting value respectively, and computes the sum of the differences. If the sum of the differences is equal to or smaller than a threshold sum of difference, the digital logic circuit DIG determines that the optical mouse is in a resting state, and if the sum of the differences is larger than the threshold sum of difference, the digital logic circuit DIG determines that the optical mouse is in a working state.

For example, as shown in FIG. 5, during the $(N-1)^{th}$ frame capture, the first counting value generated during the time duration $T_{N-1}$, which is from the timing when the first counting signal TAVG_EN is triggered to the timing when the second counting signal TAVG_T is triggered, is 1000. The second counting value generated during the time duration $R_{N-1}$, which is from the timing when the first counting signal TAVG_EN is triggered to the timing when the second counting signal TAVG_R is triggered, is 800. The third counting value generated during the time duration $B_{N-1}$, which is from the timing when the first counting signal TAVG_EN is triggered to the timing when the second counting signal TAVG_B is triggered, is 400. The fourth counting value generated during the time duration $L_{N-1}$, which is from the timing when the first counting signal TAVG_EN is triggered to the timing when the second counting signal TAVG_L is triggered, is 200. During the $N^{th}$ frame capture, the first counting value generated during the time duration $T_N$, which is from the timing when the first counting signal TAVG_EN is triggered to the timing when the second counting signal TAVG_T is triggered, is 995. The second counting value generated during the time duration $R_N$, which is from the timing when the first counting signal TAVG_EN is triggered to the timing when the second counting signal TAVG_R is triggered, is 804. The third counting value generated during the time duration $B_N$, which is from the timing when the first counting signal TAVG_EN is triggered to the timing when the second counting signal TAVG_B is triggered, is 400. The fourth counting value generated during the time duration $L_N$, which is from the timing when the first counting signal TAVG_EN is triggered to the timing when the second counting signal TAVG_L is triggered, is 206. In this example, assume the reference counting value is defined as the counting value outputted by the counting unit during the previous frame capture, and the threshold sum of difference is preset as 20. As a result, the operating unit OP of the digital logic circuit DIG obtains the differences between the four counting values generated during the $(N-1)^{th}$ frame capture and the four counting values generated during the $N^{th}$ frame capture, which are −5(995−1000), 4(804−800), 0(400−400) and 6(206−200), and obtains the sum of the difference, which should be 5. Since 5 is apparently less than the threshold sum of difference, the digital logic circuit DIG thus determines that the optical mouse is in a resting state.

It should be noted that, in this embodiment, the monitored pixel capacitor(s) can be within any pixel circuit in the pixel array PA, or within one or more pixel blocks in the pixel array PA, and it is not limited herein. In other words, the monitored pixel capacitor(s) can be within one or more pixel blocks near the outer ring of the pixel array PA or the center of the pixel array PA.

In this embodiment, the reason why the monitored pixel circuits at the outer ring of the pixel array PA are partitioned into a first pixel block T, a second pixel block R, a third pixel block B and a fourth pixel block L is illustrated as follows. Generally, the farther the monitored pixel blocks are apart, the larger the difference between counting values obtained within the pixel blocks. Therefore, for detection accuracy, in this embodiment, the monitored pixel circuits at the outer ring of the pixel array PA are partitioned into the first pixel block T (the upper portion of the outer ring of the pixel array PA), the second pixel block R (the right portion of the outer ring of the pixel array PA), the third pixel block B (the bottom portion of the outer ring of the pixel array PA) and the fourth pixel block L (the left portion of the outer ring of the pixel array PA).

In order to further illustrate the division of pixel array of the circuit for detecting working and resting states for an optical mouse, another embodiment is described as follows. In the embodiment to be described, only different parts from the embodiment shown in FIG. 4 are described, and the omitted parts are identical to the embodiment shown in FIG. 4. In addition, for easy instruction, similar reference numbers or symbols refer to the same elements.

Figure 6:
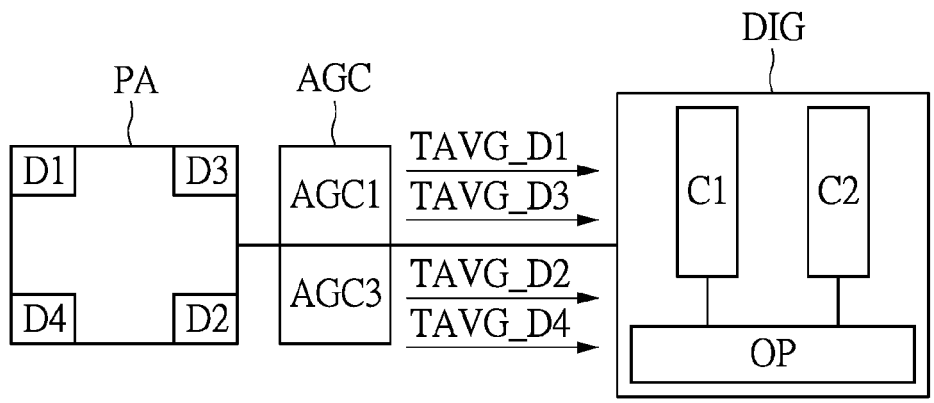
FIG. 6 shows a block diagram of a circuit for detecting working and resting states for an optical mouse in still another embodiment of the instant disclosure.

Another Embodiment of the Circuit for Detecting Working and Resting States for an Optical Mouse Please refer to FIG. 6. FIG. 6 shows a block diagram of a circuit for detecting working and resting states for an optical mouse in still another embodiment of the instant disclosure. The circuit elements and the working principles between the circuits of detecting working and resting states for an optical mouse in this embodiment and those shown in FIG. 4 are similar. However, the difference between the two embodiments is that, as shown in FIG. 6, the pixel circuits at the diagonal portions of the pixel array PA are partitioned into a first pixel block D1 and a second pixel block D2, and wherein the first pixel block D1 and the second pixel block D2 are electrically connected to a first automatic gain control module AGC1 and a second automatic gain control module AGC2 respectively, so as to monitor an average voltage of the pixel capacitors within each pixel block D1 and D2.

Figure 7:
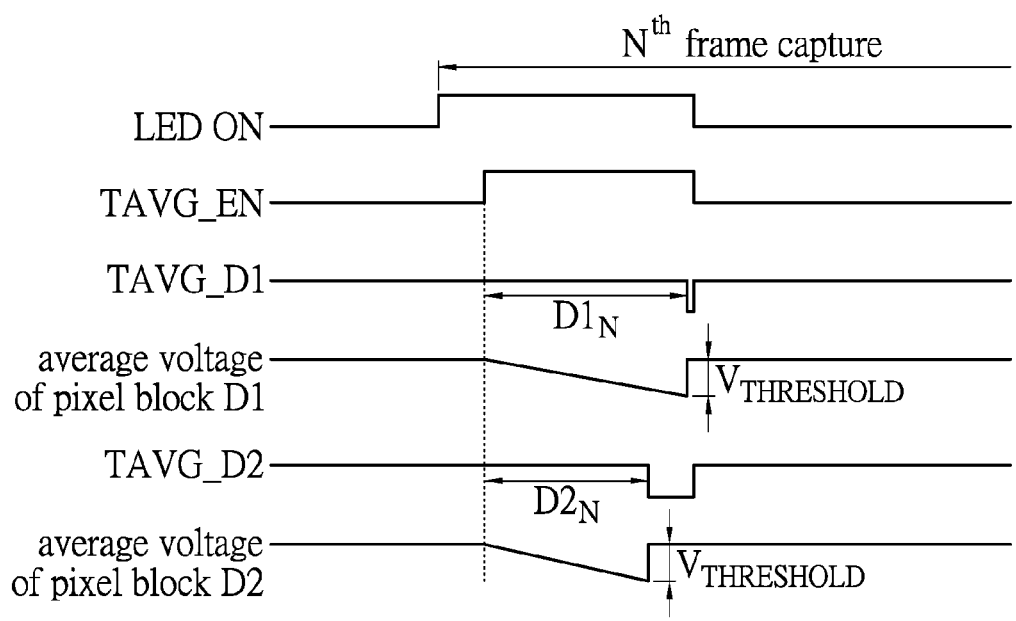
FIG. 7 shows a waveform diagram of a circuit for detecting working and resting states for an optical mouse in still another embodiment of the instant disclosure.

In order to further illustrate the working principle of the circuit for detecting working and resting states for an optical mouse described in FIG. 6, please refer to FIG. 7. FIG. 7 shows a waveform diagram of a circuit for detecting working and resting states for an optical mouse.

As shown in FIG. 7, during each frame capture, the light emitting diode LED of the optical mouse is turned on, and the photo detectors PD within the two pixel blocks D1 and D2 are turned on via receiving the reflecting lights, so that a first counting unit C1 and a second counting unit C2 of the digital logic circuit DIG respectively output a first counting signal to the first automatic gain control module AGC1 and the second automatic gain control module AGC2 as control signals to turn on the switching transistors in the two pixel blocks D1 and D2. As a result, the pixel capacitors $C_{VRST}$ within the two pixel blocks D1 and D2 begin to discharge, and during discharging the average voltages of pixel capacitors $C_{VRST}$ within the two pixel blocks D1 and D2 vary from the predetermined voltage VRST (as shown in FIG. 7, once the first counting signals are respectively triggered, the average voltages of pixel capacitors $C_{VRST}$ within the two pixel blocks D1 and D2 vary from the predetermined voltage VRST), and at the same time the first counting unit C1 and the second counting unit C2 of the digital logic circuit DIG start to count for detecting the resting state and the working state of an optical mouse.

After that, the first automatic gain control module AGC1 and the second automatic gain control module AGC 2 respectively output a second counting signal TAVG_D1 and TAVG_D2 to the digital logic circuit DIG, as the average voltages of pixel capacitors $C_{VRST}$ within two pixel blocks D1 and D2 respectively vary one threshold voltage from the predetermined voltage VRST. It is worth mentioning that, the time consumption for the average voltages of pixel capacitors $C_{VRST}$ within two pixel blocks D1 and D2 respectively to vary one threshold voltage from the predetermined voltage VRST may be different. Thus, as shown in FIG. 7, the timings when the first automatic gain control module AGC1 and the second automatic gain control module AGC 2 respectively output the second counting signal TAVG_D1 and TAVG_D2 to the digital logic circuit DIG may be also different.

Once the first counting unit C1 and the second counting unit C2 of the digital logic circuit DIG respectively receives the second counting signal TAVG_D1 and TAVG_D2, they stop counting and respectively generate a first counting value and a second counting value. In terms of circuitry, these counting values refer to counting numbers of the high-level first counting signal TAVG_EN. In terms of physics, the counting values refer to the time consumption for the average voltages of pixel capacitors $C_{VRST}$ within the two pixel blocks D1 and D2 respectively varying one threshold voltage $V_{THRESHOLD}$ from the predetermined voltage VRST.

After that, the first counting value and the second counting value, generated by the first counting unit C1 and the second counting unit C2 of the digital logic circuit DIG are received by the operating unit OP of the digital logic circuit DIG. The operating unit OP of the digital logic circuit DIG computes differences between these counting values and a reference counting value respectively, and computes the sum of the differences. If the sum of the differences is equal to or smaller than a threshold sum of difference, the digital logic circuit DIG determines that the optical mouse is in a resting state, and if the sum of the differences is larger than the threshold sum of difference, the digital logic circuit DIG determines that the optical mouse is in a working state.

For example, as shown in FIG. 7, during the $N^{th}$ frame capture, the first counting value generated during the time duration $D1_N$, which is from the timing when the first counting signal TAVG_EN is triggered to the timing when the second counting signal TAVG_D1 is triggered, is 1012. The second counting value generated during the time duration $D2_N$, which is from the timing when the first counting signal TAVG_EN is triggered to the timing when the second counting signal TAVG_D2 is triggered, is 810. In this example, assume the reference counting value is defined as the counting value outputted by the counting unit during one frame capture when the optical mouse is in the resting state, assume that the two counting values generated within the pixel blocks D1 and D2 during one frame capture when the optical mouse is in the resting state are 1000 and 800 respectively, and assume that the threshold sum of difference is preset as 20. As a result, the operating unit OP of the digital logic circuit DIG obtains the differences between the two counting values generated during the $N^{th}$ frame capture and the two counting values generated during one frame capture when the optical mouse is in the resting state, which are 12(1012−1000) and 10(810−800), and obtains the sum of the difference, which should be 22. Since 22 is apparently larger than the threshold sum of difference, the digital logic circuit DIG thus determines that the optical mouse is in a working state.

As mentioned above, in this embodiment, the monitored pixel capacitor(s) can be within one or more pixel blocks near the outer ring of the pixel array PA or the center of the pixel array PA, and it is not limited herein.

However, in this embodiment, the reason why the monitored pixel circuits at the diagonal portion of the pixel array PA are partitioned into a first pixel block D1 and a second pixel block D2 is illustrated as follows. As mentioned, the farther the monitored pixel blocks are apart, the larger the difference between counting values obtained within the pixel blocks is. With respect to the distance, the distance between the pixel blocks D1 and D2 in this embodiment is larger than the distance between the pixel blocks T and B and larger than the distance between the pixel blocks R and L. Thus, compared with the last embodiment, the detection accuracy can be further optimized in this embodiment. It should be noted that, as shown in FIG. 6, considering the distance between the monitored pixel blocks, in this embodiment, it is also practical to monitor the pixel circuits at the diagonal portion of the pixel array PA, which is partitioned into a third pixel block D3 and a fourth pixel block D4. In addition, it is also an option to monitor the pixel circuits at the diagonal portion of the pixel array PA, which is partitioned into a first pixel block D1, a second pixel block D2 a third pixel block D3 and a fourth pixel block D4.

Finally, there are several embodiments to illustrate the method for detecting working and resting states for an optical mouse which can be conducted in the circuit for detecting working and resting states for an optical mouse shown in FIGS. 2, 4 and 6, and thus please refer to FIGS. 2, 4 and 6 for further understanding.

Figure 8:
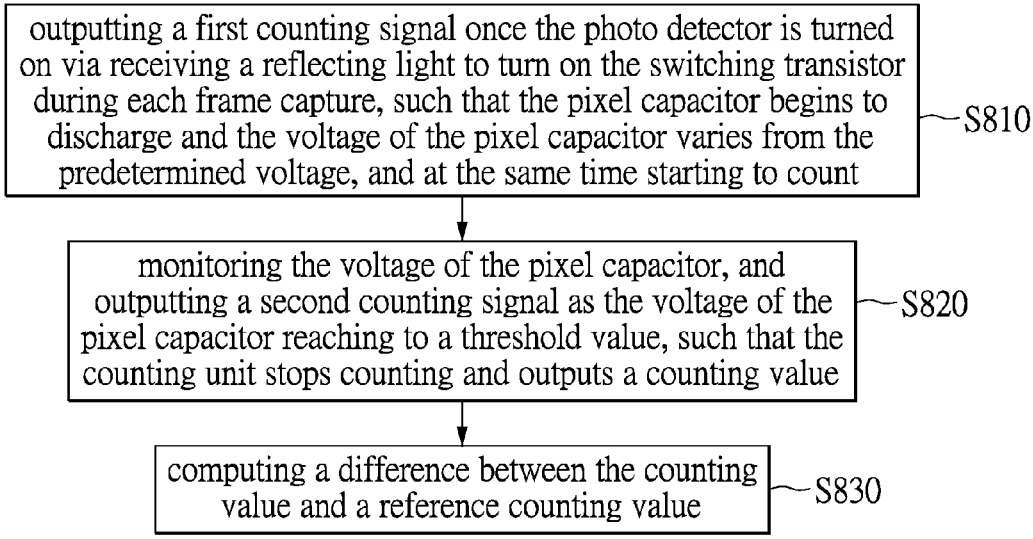
FIG. 8 shows a flow chart of a method for detecting working and resting states for an optical mouse in one embodiment of the instant disclosure.

One Embodiment of the Method for Detecting Working and Resting States for an Optical Mouse Please refer to FIG. 8. FIG. 8 shows a flow chart of a method for detecting working and resting states for an optical mouse in one embodiment of the instant disclosure.

The method for detecting working and resting states for an optical mouse in this embodiment can be implemented in the circuit for detecting working and resting states for an optical mouse 2 provided by the embodiment shown in FIG. 2. The circuit for detecting working and resting states for an optical mouse 2 provided by the embodiment shown in FIG. 2 comprises a pixel array, at least one automatic gain control module and a digital logic circuit. The pixel array comprises a plurality of pixel circuits, and each pixel circuit comprises at least a photo detector, a pixel capacitor charged to a predetermined voltage and a switching transistor. The digital logic circuit comprises an operating unit and at least one counting unit. Based on the above configuration, the method for detecting working and resting states for an optical mouse in this embodiment can be described as follows.

To begin with, the Step S810 is to output a first counting signal once the photo detector is turned on via receiving a reflecting light to turn on the switching transistor during each frame capture, such that the pixel capacitor begins to discharge and the voltage of the pixel capacitor varies from the predetermined voltage, and at the same time the counting unit starts to count. After that, the Step S820 is to monitor the voltage of the pixel capacitor and to output a second counting signal as the voltage of the pixel capacitor varies one threshold from the predetermined voltage, such that the counting unit stops counting and outputs a counting value. Finally, the Step S830 is to compute a difference between the counting value and a reference counting value. Specifically speaking, in the Step S830, if the difference is equal to or smaller than a threshold difference, the optical mouse is determined to be in a resting state, and if the difference is larger than the threshold difference, the optical mouse is determined to be in a working state.

In this embodiment, the reference counting value can be defined as a counting value outputted by the counting unit during the previous frame capture, or can be defined as a counting value outputted by the counting unit during one frame capture when the optical mouse is in the resting state, however, it is not limited herein.

Figure 9:
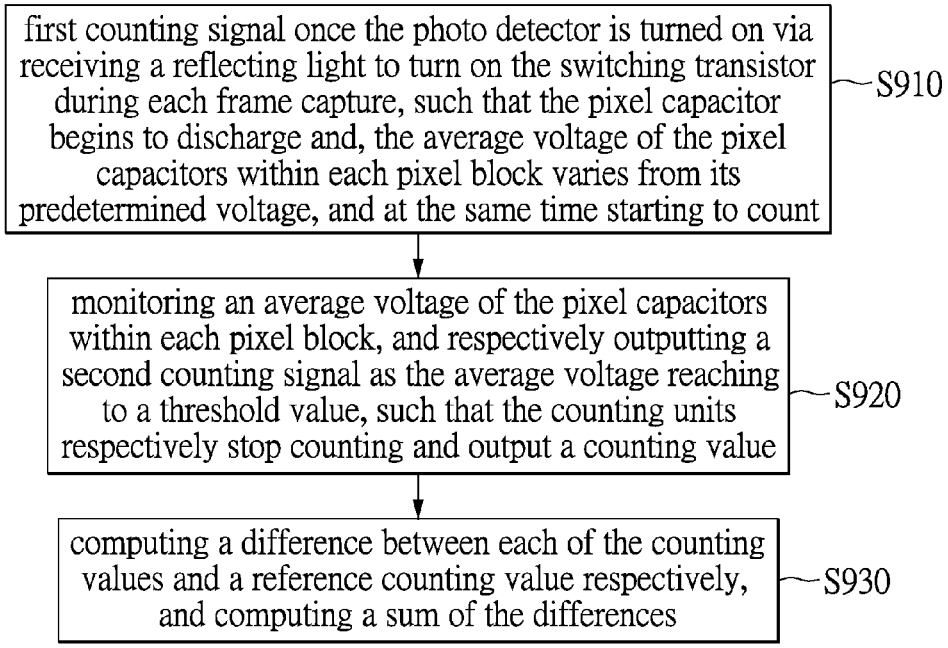
FIG. 9 shows a flow chart of a method for detecting working and resting states for an optical mouse in another embodiment of the instant disclosure.

Another Embodiment of the Method for Detecting Working and Resting States for an Optical Mouse Please refer to FIG. 9. FIG. 9 shows a flow chart of a method for detecting working and resting states for an optical mouse in another embodiment of the instant disclosure.

The method for detecting working and resting states for an optical mouse in this embodiment can be implemented in the circuits of detecting working and resting states for an optical mouse 4 and 6 provided by the embodiments shown in FIGS. 4 and 6. The circuits of detecting working and resting states for an optical mouse 4 and 6 provided by the embodiment shown in FIGS. 4 and 6 comprise a pixel array, at least one automatic gain control module and a digital logic circuit. The pixel array comprises a plurality of pixel circuits, and part of the pixel circuits are partitioned into a plurality of pixel blocks. In addition, each pixel circuit comprises at least a photo detector, a pixel capacitor charged to a predetermined voltage and a switching transistor. The digital logic circuit comprises an operating unit and at least one counting unit. Based on the above configuration, the method for detecting working and resting states for an optical mouse in this embodiment can be described as follows.

To begin with, the Step S910 is to output a first counting signal once the photo detector is turned on via receiving a reflecting light to turn on the switching transistor during each frame capture, such that the pixel capacitor begins to discharge and, the average voltage of the pixel capacitors within each pixel block varies from its predetermined voltage, and at the same time each counting unit starts to count. After that, the Step S920 is to monitor an average voltage of the pixel capacitors within each pixel block and to respectively output a second counting signal as the average voltage of the pixel capacitors within each pixel block varies one threshold from the predetermined voltage, such that the counting units respectively stop counting and output a counting value. Finally, the Step S930 is to compute a difference between each of the counting values and a reference counting value respectively, and to compute a sum of the differences. Specifically speaking, in the Step S930, if the sum of the differences is equal to or smaller than a threshold sum of difference, the optical mouse is determined to be in a resting state, and if the threshold sum of difference is larger than the threshold difference, the optical mouse is determined to be in a working state.

Likewise, in this embodiment, the reference counting value can be defined as a counting value outputted by the counting unit during the previous frame capture, or can be defined as a counting value outputted by the counting unit during one frame capture when the optical mouse is in the resting state, however, it is not limited herein.

Moreover, in this embodiment, the monitored pixel capacitor(s) can be within the pixel circuits partitioned into blocks at the outer ring of the pixel array PA, or at the diagonal portions of the pixel array PA, and it is not limited herein.

Compared with the traditional circuit and method for detecting working and resting states for an optical mouse, the instant disclosure does not capture full images and use spatial filters for the image optimization. Moreover, the instant disclosure does not need a large amount of memory to store the reference images and the newly-captured images which are processed.

Instead, the circuit and method for detecting working and resting states for an optical mouse provided by the instant disclosure monitors the voltage variation of the pixel capacitor, and generates a counting value via a counter as the voltage of the pixel capacitor varies from a predetermined voltage value. After that, the instant disclosure compares the counting value and the reference counting value and obtains a difference there between, and based on the difference, the instant disclosure can easily determine the state of the optical mouse, which not only simplifies the working mechanism for detecting working and resting states for an optical mouse, but also reduces the element cost for the circuit.

The descriptions illustrated supra set forth simply the preferred embodiments of the instant disclosure; however, the characteristics of the instant disclosure are by no means restricted thereto. All changes, alterations, or modifications conveniently considered by those skilled in the art are deemed to be encompassed within the scope of the instant disclosure delineated by the following claims.

What is claimed is:

1. A circuit for detecting working and resting states for an optical mouse, comprising:
    a pixel array, comprising a plurality of pixel circuits, wherein each pixel circuit comprises:
        a photo detector;
        a pixel capacitor, charged to a predetermined voltage in advance, wherein one end of the pixel capacitor is grounded; and
        a switching transistor, having source electrically connected to the other end of the pixel capacitor, having drain electrically connected to the photo detector and having gate grounded;
    at least one automatic gain control module, electrically connected to the pixel array, configured to monitor the voltage variation of the pixel capacitor; and
    a digital logic circuit, electrically connected to the automatic gain control module, comprising:
        at least one counting unit, during each frame capture, as the photo detector is turned on via receiving a reflecting light, the counting unit outputting a first counting signal to the automatic gain control module to turn on the switching transistor, such that the pixel capacitor begins to discharge and the voltage of the pixel capacitor starts to vary from the predetermined voltage, and at the same time the counting unit starts to count, and the automatic gain control module outputting a second counting signal to the digital logic circuit as the voltage of the pixel capacitor varies one threshold from the predetermined voltage, such that the counting unit of the digital logic circuit stops counting and outputs a counting value; and
        a computing unit, electrically connected to the counting unit, configured to receive the counting value and compute a difference between the counting value and a reference counting value, wherein the optical mouse is determined to be in a resting state if the difference is equal to or smaller than a threshold difference, and the optical mouse is determined to be in a working state if the difference is larger than a threshold difference.

2. The circuit for detecting working and resting states for an optical mouse according to claim 1, wherein the reference counting value is a counting value outputted by the counting unit during the previous frame capture.

3. The circuit for detecting working and resting states for an optical mouse according to claim 1, wherein the reference counting value is a counting value outputted by the counting unit during one frame capture when the optical mouse is in the resting state.

4. The circuit for detecting working and resting states for an optical mouse according to claim 1,
    wherein the pixel circuits at the outer ring of the pixel array are partitioned into a first pixel block, a second pixel block, a third pixel block and a fourth pixel block, and
    wherein the first pixel block, the second pixel block, the third pixel block and the fourth pixel block are electrically connected to a first automatic gain control module, a second automatic gain control module, a third automatic gain control module and a fourth automatic gain control module respectively, so as to monitor an average voltage of the pixel capacitors within each pixel block.

5. The circuit for detecting working and resting states for an optical mouse according to claim 4, wherein the digital logic circuit comprises a first counting unit, a second counting unit, a third counting unit and a fourth counting unit electrically connected to the first automatic gain control module, the second automatic gain control module, the third automatic gain control module and the fourth automatic gain control module respectively.

6. The circuit for detecting working and resting states for an optical mouse according to claim 5,
    wherein during each frame capture, as the photo detector is turned on via receiving the reflecting light, the first counting unit, the second counting unit, the third counting unit and the fourth counting unit respectively output a first counting signal to the first automatic gain control module, the second automatic gain control module, the third automatic gain control module and the fourth automatic gain control module to turn on the corresponding switching transistor, such that the average voltages of the pixel capacitors within the first pixel block, the second pixel block, the third pixel block and the fourth pixel block vary from the predetermined voltage, and at the same time the first counting unit, the second counting unit, the third counting unit and the fourth counting unit start to count, and
    wherein the first automatic gain control module, the second automatic gain control module, the third automatic gain control module and the fourth automatic gain control module respectively output a second counting signal to the digital logic circuit as the average voltages of the pixel capacitors within the first pixel block, the second pixel block, the third pixel block and the fourth pixel block vary one threshold from the predetermined voltage, such that the first counting unit, the second counting unit, the third counting unit and the fourth counting unit stop counting and output a first counting value, a second counting value, a third counting value and a fourth counting value respectively.

7. The circuit for detecting working and resting states for an optical mouse according to claim 6,
    wherein after receiving the first counting value, the second counting value, the third counting value and the fourth counting value, the computing unit computes differences between a reference counting value, and the first counting value, the second counting value, the third counting value and the fourth counting value respectively, and computes a sum of the differences, and
    if the sum of the differences is equal to or smaller than a threshold sum of difference, the optical mouse is determined to be in a resting state, and if the sum of the differences is larger than the threshold sum of difference, the optical mouse is determined to be in a working state.

8. The circuit for detecting working and resting states for an optical mouse according to claim 1, wherein the pixel circuits at the diagonal portions of the pixel array are partitioned into a first pixel block and a second pixel block, and wherein the first pixel block and the second pixel block are electrically connected to a first automatic gain control module and a second automatic gain control module respectively, so as to monitor an average voltage of the pixel capacitors within each pixel block.

9. The circuit for detecting working and resting states for an optical mouse according to claim 8, wherein the digital logic circuit comprises a first counting unit and a second counting unit electrically connected to the first automatic gain control module and the second automatic gain control module respectively.

10. The circuit for detecting working and resting states for an optical mouse according to claim 9,
wherein during each frame capture, as the photo detector is turned on via receiving the reflecting light, the first counting unit and the second counting unit respectively output a first counting signal to the first automatic gain control module and the second automatic gain control module to turn on the corresponding switching transistor, such that the average voltages of the pixel capacitors within the first pixel block and the second pixel block vary from the predetermined voltage, and at the same time the first counting unit and the second counting unit start to count, and
wherein the first automatic gain control module and the second automatic gain control module respectively output a second counting signal to the digital logic circuit as the average voltages of the pixel capacitors within the first pixel block and the second pixel block vary one threshold from the predetermined voltage, such that the first counting unit and the second counting unit output a first counting value and a second counting value respectively.

11. The circuit for detecting working and resting states for an optical mouse according to claim 10,
wherein after receiving the first counting value and the second counting value, the computing unit computes differences between a reference counting value, and the first counting value and the second counting value respectively, and computes a sum of the differences, and
if the sum of the differences is equal to or smaller than a threshold sum of difference, the optical mouse is determined to be in a resting state, and if the sum of the differences is larger than the threshold sum of difference, the optical mouse is determined to be in a working state.

12. A method for detecting working and resting states for an optical mouse, used in a circuit for detecting working and resting states for an optical mouse, the circuit comprising a pixel array, at least one automatic gain control module and a digital logic circuit, the pixel array comprising a plurality of pixel circuits and each pixel circuit comprising a photo detector, a pixel capacitor charged to a predetermined voltage and a switching transistor, the digital logic circuit comprising at least one counting unit and a computing unit, the method for detecting working and resting states for an optical mouse comprising:
during each frame capture, outputting a first counting signal to turn on the switching transistor as the photo detector is turned on via receiving a reflecting light, such that the pixel capacitor begins to discharge, and the voltage of the pixel capacitor varies from the predetermined voltage, and at the same time starting to count;
monitoring the voltage of the pixel capacitor, and outputting a second counting signal as the voltage of the pixel capacitor varies one threshold from the predetermined voltage, such that the counting unit stops counting and outputs a counting value; and
computing a difference between the counting value and a reference counting value;
wherein if the difference is equal to or smaller than a threshold difference, the optical mouse is determined to be in a resting state, and if the difference is larger than the threshold difference, the optical mouse is determined to be in a working state.

13. The method for detecting working and resting states for an optical mouse according to claim 12, wherein the reference counting value is a counting value outputted by the counting unit during the previous frame capture.

14. The method for detecting working and resting states for an optical mouse according to claim 12, wherein the reference counting value is a counting value outputted by the counting unit during one frame capture when the optical mouse is in the resting state.

15. A method for detecting working and resting states for an optical mouse, used in a circuit for detecting working and resting states for an optical mouse, the circuit comprising a pixel array, at least one automatic gain control module and a digital logic circuit, the pixel array comprising a plurality of pixel circuits, part of pixel circuits partitioned into a plurality of pixel blocks and each pixel circuit comprising a photo detector, a pixel capacitor charged to a predetermined voltage and a switching transistor, the digital logic circuit comprising a plurality of counting units and a computing unit, the method for detecting working and resting states for an optical mouse comprising:
during each frame capture, outputting a first counting signal to turn on the switching transistor, such that the pixel capacitor begins to discharge, the voltage of the pixel capacitor varies from the predetermined voltage, and at the same time starting to count;
monitoring an average voltage of the pixel capacitors within each pixel block, and respectively outputting a second counting signal as the average voltage varies one threshold from the predetermined voltage, such that the counting units respectively stop counting and output a counting value; and
computing a difference between each of the counting values and a reference counting value respectively, and computing a sum of the differences;
wherein if the sum of the differences is equal to or smaller than a threshold sum of difference, the optical mouse is determined to be in a resting state, and if the threshold sum of difference is larger than the threshold difference, the optical mouse is determined to be in a working state.

16. The method for detecting working and resting states for an optical mouse according to claim 15, wherein the reference counting value is a counting value outputted by the counting unit during the previous frame capture.

17. The method for detecting working and resting states for an optical mouse according to claim 15, wherein the reference counting value is a counting value outputted by the counting unit during one frame capture when the optical mouse is in the resting state.

18. The method for detecting working and resting states for an optical mouse according to claim 15, wherein the pixel blocks are at the outer ring of the pixel array.

19. The method for detecting working and resting states for an optical mouse according to claim 15, wherein the pixel blocks are at the diagonal portions of the pixel array.

* * * * *